United States Patent Office 3,598,736
Patented Aug. 10, 1971

3,598,736
POLYALKYLMETHACRYLATES AS POUR POINT
DEPRESSANTS FOR LUBRICATING OILS
Pieter H. Van der Meij and Arnold A. Buitelaar, Amsterdam, Netherlands, assignors to Shell Oil Company, New York, N.Y.
No Drawing. Filed Aug. 19, 1968, Ser. No. 753,777
Claims priority, application Great Britain, Aug. 30, 1967, 39,700/67
Int. Cl. C10m 1/28, 1/26
U.S. Cl. 252—56
6 Claims

ABSTRACT OF THE DISCLOSURE

Pour points of lubricating oils with widely varying viscosities are depressed by adding thereto small amounts of novel oil soluble polyalkylmethacrylates.

---

This invention relates to novel oil soluble polyalkylmethacrylates which can be effectively used in lubricating oil compositions to reduce the pour point.

It is known in the art that certain polymeric materials exhibit the property of lowering pour points of lubricating oils. The influence on the pour point of an oil by any particular polymer, however, is unpredictable. Some polymers actually increase pour points, while others are effective in reducing pour points only if used in large concentrations or with lubricating oils of a specific viscosity range. The development of a pour point depressant which could be used in small concentrations yet be effective over a wide range of viscosities would be extremely desirable.

It has been found that a group of novel oil-soluble polyalkylmethacrylates with a special structure possess the aforementioned characteristics. The present additive consists of polyalkyl methacrylates wherein the alkyl group has from 10-20 carbon atoms and meets the following three requirements:

(1) The average number of carbon atoms of the alkyl chains in the methacrylates is between 13.8 and 14.8.

(2) The molar percentage of the alkyl methacrylates with branched alkyl chains is between 10 and 30.

(3) The molar percentage of the alkyl methacrylates with an odd number of carbon atoms in the alkyl chain is between 20 and 50.

Preference is given to polyalkyl methacrylates in which the average number of carbon atoms in the alkyl chains is between 14.0 and 14.6 and to polyalkyl methacrylates in which the molar percentage of the alkyl methacrylates with branched alkyl chains is between 15 and 25.

The novel polyalkyl methacrylates are obtained by polymerization of a mixture of alkyl methacrylates at least part of which consists of alkyl methacrylates with 10-20 carbon atoms in the alkyl group. By the correct choice of the nature of the alkyl chains in the alkyl methacrylates with 10-20 carbon atoms in the alkyl group, and of the mutual ratio by weight of these alkyl methacrylates in the mixture to be polymerized, a simple process yields polymers meeting the three afore-mentioned criteria. These polymers are capable not only of considerably depressing the pour point of light lubricating oils, such as spindle oil and light machine oil, but show in addition a high activity as pour point depressants in heavy lubricating oils rich in residual components, such as heavy machine oil.

In addition to the alkyl methacrylates with 10-20 carbon atoms in the alkyl group, the monomer mixture may also contain other alkyl methacrylates. These can comprise both alkyl methacrylates with less than 10 carbon atoms in the alkyl group or alkyl methacrylates with more than 20 carbon atoms in the alkyl group. The copolymerization of alkyl methacrylates with less than 10 carbon atoms in the alkyl group in the preparation of the polymers is desirable if the addition of these polymers to a lubricating oil is intended to improve the viscosity index (VI) as well as the pour point of the oil. Polymers prepared from alkyl methacrylates with less than 10 carbon atoms in the alkyl group, such as methyl methacrylates, are capable, when used in higher concentrations, of improving the VI of lubricating oils, while still displaying strong activity as pour point depressants. When these polymers are used in lower concentrations, however, their activity as pour point depressants is generally reduced.

If the polymers in question are to be used exclusively as pour point depressants, one should select polymers prepared by the copolymerization of a mixture of alkyl methacrylates with more than 9 carbon atoms in the alkyl group because these polymers show a high activity even at very low concentrations. Suitable polymers for the present purpose can be prepared by the polymerization of a mixture of alkyl methacrylates, part of which are derived from unbranched natural and/or synthetic alcohols with 16 and/or 18 carbon atoms, and the remaining part from a mixture of branched and unbranched synthetic alcohols with 12-15 carbon atoms. The 12-15 carbon atom alcohols can be obtained by reacting a mixture of olefins with 11-14 carbon atoms with carbon monoxide and hydrogen in the presence of a complex catalyst consisting of cobalt, carbon monoxide and a phosphorus compound.

Very favorable results have been achieved using copolymers prepared in this manner. The following copolymers have exhibited exceptionally good pour point depressing activity:

(1) A copolymer of n- and iso-$(C_{12}-C_{15})$ methacrylate with n-$C_{18}$ methacrylate, in particular a copolymer containing 76% m. of n- and iso-$(C_{12}-C_{15})$ methacrylate and 24% m. of n-$C_{18}$ methacrylate. Also a copolymer containing 85% m. of n- and iso-$(C_{12}-C_{15})$ methacrylate and 15% m. of n-$C_{18}$ methacrylate.

(2) A copolymer of n- and iso-$(C_{12}-C_{15})$ methacrylate with n-$C_{16}$ methacrylate, in particular a copolymer containing 74% m. of n- and iso-$(C_{12}-C_{15})$ methacrylate and 26% m. of n-$C_{16}$ methacrylate.

(3) A copolymer of n- and iso-$(C_{12}-C_{15})$ methacrylate with n-$C_{16}$ methacrylate and n-$C_{18}$ methacrylate, in particular a copolymer containing 66% m. of n- and iso-$(C_{12}-C_{15})$ methacrylate, 17% m. of n-$C_{16}$ methacrylate and 17% m. of n-$C_{18}$ methacrylate. Also a copolymer containing 75% m. of n- and iso-$(C_{12}-C_{15})$ methacrylate, 12% m. of n-$C_{16}$ methacrylate and 13% m. of n-$C_{18}$ methacrylate, and finally a copolymer containing 85% m. of n- and iso-$(C_{12}-C_{15})$ methacrylate, 7% m. of n-$C_{16}$ methacrylate and 8% m. of n-$C_{18}$ methacrylate.

The molecular weight of the polymers according to the invention can vary within wide limits. Polymers used as lubricating oil additives should have an average molecular weight (number average $M_n$) of between $2 \times 10^3$ and $10^6$, in particular between $5 \times 10^3$ and $10^5$. The molecular weight was determined by an ebullioscopic method.

When the polymers are used as lubricating oil additives, they can be added directly to the oil or in the form of a concentrate obtained by mixing the polymers with a small quantity of oil.

The concentration in which the polymers can be used may also vary within wide limits, dependent on the structure and the molecular weight of the polymer to be used, the nature and the quantity of the paraffin waxes present in the luboil and the pour point depressing effect to be achieved. In some cases a quantity of 0.01% w. calculated on the lubricating oil composition is sufficient to reach the desired pour point. In most cases a quantity of 2.0% w. is ample. One preferably incorporates 0.05 to 0.5% w. of the polymers in the lubricating oil. If the application of the polymers in question is directed to VI improvement as well as pour point depression, it may be desirable to incorporate quantities of the polymers greater than the aforementioned 2.0% w.

When the polymers concerned are used as lubricating oil additives, they can be combined with other additives such as anti-oxidants, additives with a detergent action, viscosity-increasing compounds, anti-corrosives, anti-foaming agents, agents to improve the lubricating effect and other compounds which are usually added to lubricating oils.

The invention is illustrated in the following examples.

Base oils

Oil A: Spindle oil with a VI of 100 and a viscosity of 65 s Redwood at 140° F.

Oil B: Medium machine oil with a VI of 95 and a viscosity of 160 s Redwood at 140° F. This oil contained 15% w. of deasphalted, refined and dewaxed short residue.

Oil C: Heavy machine oil with a VI of 95 and a viscosity of 650 s Redwood at 140° F. This oil was a 100% w. deasphalted, refined and dewaxed short residue.

The three base oils had a pour point of +15° F. (determined according to ASTM D-97) and had been prepared from a Middle East crude.

Polymers according to the invention

Seven polymers were prepared according to the invention by copolymerization of a mixture of alkyl methacrylates partly derived from unbranched natural alcohols with 16 and/or 18 carbon atoms and for the remaining part from a mixture of branched and unbranched synthetic alcohols with 12-15 carbon atoms. This alcohol mixture has been obtained by reaction of a mixture of olefins with 11-14 carbon atoms with carbon monoxide and hydrogen in the presence of a complex catalyst consisting of cobalt, carbon monoxide and a phosphorus compound.

In preparing the polymers according to the invention, the following conditions were adhered to:

Monomer concentration: 20% w. for the preparation of polymers with $M_n=25,000$ and 42.5% w. for the preparation of polymers with $M_n=50,000$.
Solvent: toluene
Initiator: benzoyl peroxide
Initiator concentration: 0.25% w. for the preparation of polymers with $M_n=25,000$ and 0.30% w. for the preparation of polymers with $M_n=50,000$.
Temperature: 80° C.
Polymerization time: 24 hours The composition of the polymers is shown in Table I.

TABLE I

| | | For the alkyl methacrylates with 10-20 carbon atoms in the alkyl group we have— | | | |
|---|---|---|---|---|---|
| Polymer number | Molar ratio [1] | Average number of carbon atoms in the alkyl chains | Molar percentage of alkyl methacrylates | | Average molecular weight [3] |
| | | | With a branched alkyl chain | With an odd number [2] | |
| I | 76-0-24 | 14.5 | 20.1 | 37.2 | 25,000 |
| II | 85-0-15 | 14.1 | 22.5 | 41.6 | 25,000 |
| III | 66-17-17 | 14.7 | 17.5 | 32.3 | 25,000 |
| IV | 75-12-13 | 14.3 | 19.9 | 36.9 | 25,000 |
| V | 75-12-13 | 14.3 | 19.9 | 36.9 | 50,000 |
| VI | 85-7-8 | 14.0 | 22.4 | 41.4 | 25,000 |
| VII | 74-26-0 | 14.1 | 19.7 | 36.5 | 25,000 |

[1] n- and iso-($C_{12}$-$C_{15}$) methacrylate/n-$C_{16}$ methacrylate/n-$C_{18}$ methacrylate.
[2] Carbon atoms in the alkyl chain.
[3] Number average $M_n$ of the polymers.

Commercial pour point depressants

For comparison, four commercial pour point depressants were included in the investigation. They were also polyalkyl methacrylates, but failed to meet one or more of the criteria for the polymers according to the invention. The composition of these commercial pour point depressants is shown in Table II.

TABLE II

| Polymer number | Percent by weight of the various alkyl methacrylates present in the polymers | | | | | | | For the alkyl methacrylates with 10-20 carbon atoms in the alkyl group we have— | | |
|---|---|---|---|---|---|---|---|---|---|---|
| | $C_1$ | n-$C_4$ | Oxo- $C_8$-$C_{12}$ | n-$C_{12}$ | n-$C_{14}$ | n-$C_{16}$ | n-$C_{18}$ | Average number of carbon atoms in the alkyl chains | Molar percentage of alkyl methacrylates | |
| | | | | | | | | | With a branched alkyl chain | With an odd number [1] |
| 1 | | | | 37 | 27 | 13 | 23 | 14.4 | 0 | 0 |
| 2 | | | | 35 | 31 | 18 | 16 | 14.3 | 0 | 0 |
| 3 | | | 52 | 2 | 2 | 13 | 31 | 14.4 | 42.2 | 14.1 |
| 4 | 11 | 1 | 56 | 3 | 2 | 13 | 24 | 14.5 | 39.1 | 13.0 |

[1] Carbon atoms in the alkyl chain.

To study their activity as pour point depressants, polymers I-VII and 1-4 were added in different concentrations to lube oils A, B and C. The pour point of each lube oil composition was determined according to ASTM D-97. The results are listed in Table III.

TABLE III

| | Type of oil, pour point 15° F. | | | | | | | | |
|---|---|---|---|---|---|---|---|---|---|
| Polymer concentration, percent weight | Oil A | | | Oil B | | | Oil C | | |
| | 0.1 | 0.2 | 0.5 | 0.1 | 0.2 | 0.5 | 0.1 | 0.2 | 0.5 |
| Polymer added: | | | | | | | | | |
| I | −25 | | | | | | | | |
| II | −25 | | | | | | | | |
| III | −20 | | | | | | | | |
| IV | −20 | −30 | −35 | −15 | −15 | −20 | +5 | 0 | 0 |
| V | −20 | −30 | −30 | −20 | −20 | −20 | +5 | 0 | −10 |
| VI | −20 | | | | | | | | |
| VII | −30 | | | | | | | | |
| 1 | −15 | −20 | −20 | −15 | −15 | −15 | +5 | 0 | 0 |
| 2 | −15 | −20 | −25 | | | | | | |
| 3 | −15 | −20 | −30 | +5 | −5 | −15 | +15 | +15 | +15 |
| 4 | −3 | −10 | −20 | | | | | | |

The results in Table III indicate the following:
(1) In oil A the polymers according to the invention are for the most part better four point depressants than the commercial products. Of the latter, additive 3 is the most effective.

(2) In oil B the products IV and V according to the invention are better pour point depressants than commercial additives 1 and 3.

(3) In oil C the products IV and V are at least as active as the best commercial additive. Additive 3, which in oil A gave the best performance among the commercial additives, is completely inactive in oil C.

Unlike the commercial additives tested, the polymers according to the invention offer the significant advantage of displaying a high activity in lube oils with widely varying viscosity.

We claim as our invention:

1. A lubricating oil composition consisting essentially of a major amount of lubricating oil and a minor amount of oil soluble copolymer of polyalkylmethacrylates of improved pour point properties having (1) a molar percentage of alkyl methacrylates with branched alkyl chains between 10 and 30%, (2) a molar percentage of alkyl methacrylates with unbranched alkyl chains having an odd number of carbon atoms in the alkyl chains between 20 and 50%, (3) an average molecular weight of 2000 to 2,000,000, wherein the alkyl groups in both alkyl methacrylates contain 10 to 20 carbon atoms with an average of between 13.8 and 14.8 carbon atoms.

2. The composition of claim 1 in which the percentage of oil-soluble polyalkyl methacrylates is about 0.01–2.0% w.

3. The composition of claim 1 in which the molar percentage of alkyl methacrylates with branched alkyl chains is 15–25.

4. The composition of claim 1 in which the average number of carbon atoms of the alkyl chains is 14.0 to 14.6.

5. The composition of claim 4 in which the molar percentage of alkyl methacrylates with branched alkyl chains is 15–25.

6. The composition of claim 4 in which the average molecular weight of the copolymer is between 5,500 and 500,000.

References Cited

UNITED STATES PATENTS 2,655,479   10/1953   Munday et al. _____ 252—56

OTHER REFERENCES

Kirk-Othmer "Encycl. of Chem. Technol.," vol. 14 (2nd Ed.) pp. 386 and 387 (1967).

DANIEL E. WYMAN, Primary Examiner

W. H. CANNON, Assistant Examiner

U.S. Cl. X.R.

260—89.5